UNITED STATES PATENT OFFICE.

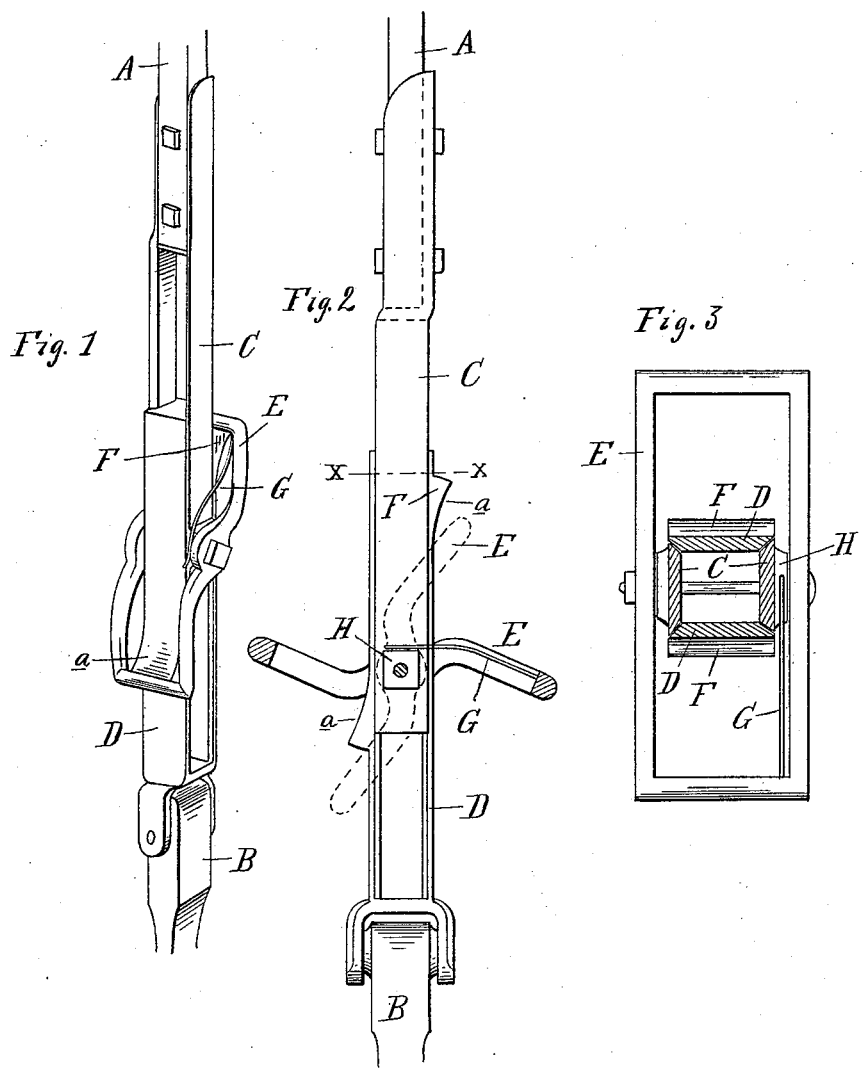

CLARENCE J. HAMILTON, OF PLYMOUTH, MICHIGAN, ASSIGNOR OF ONE-HALF TO CYRUS A. PINCKNEY, OF SAME PLACE.

PUMP-ROD COUPLING.

SPECIFICATION forming part of Letters Patent No. 406,276, dated July 2, 1889.

Application filed May 22, 1888. Renewed June 7, 1889. Serial No. 313,449. (No model.)

*To all whom it may concern:*

Be it known that I, CLARENCE J. HAMILTON, a citizen of the United States, residing at Plymouth, in the county of Wayne and State of Michigan, have invented certain new and useful Improvements in Pump-Rod Couplings, of which the following is a specification, reference being had therein to the accompanying drawings.

This invention relates to new and useful improvements in pump-rod couplings; and the object of the invention is to provide a simple and efficient connection applicable to the pump-rod of windmills, whereby the same may be readily uncoupled from the pump whenever it is desired to have the mill cease pumping, a contingency often arising when it is desired to pump by hand, or in cold weather where there is a liability of damage from freezing up of the pump or some of its connections, and where such liability cannot be guarded against by turning the windmill "out of the wind," on account of the usual tendency of most windmills to turn in a heavy wind even when out of the wind.

To this end my invention consists of a sliding joint provided with a locking-bail, whereby the joint may be locked or unlocked, all as more fully hereinafter described, and shown in the drawings, of which—

Figure 1 is a perspective view of my improved pump-rod coupling; Fig. 2, a side elevation, partly in section; and Fig. 3, a horizontal section on line $x$ $x$ in Fig. 2, showing the locking-bail in plan.

A is the pump-rod of the mill, and B is the lower portion of the pump-rod connected with the pump, and these two parts are connected together by means of a sliding joint consisting of the parts C and D, the part C being attached to the pump-rod A, and the part D being connected to the part B. Each of the parts C and D is provided with two parallel flat bars which mutually embrace each other upon opposite sides, so as to form a continuation of the pump-rod with a sufficient length of play to allow the windmill to actuate its portion of the pump-rod without affecting the lower portion B thereof, which actuates the pump.

To one of the parts of the coupling I pivotally secure the double bail E, and the other coupling I provide with the stops or rests F, so arranged as to permit the bail E to engage thereon, whereby the two couplings are rigidly secured together, as shown in Fig. 1. By turning the bail out of engagement with these stops the two parts of the coupling are free to slide upon each other, and in this latter position the bail is held from accidental displacement by a suitable spring G, which bears against the shoulder H, formed on the pivot of the bail or in any other suitable manner; and to further guard against accidental re-engagement of the bail with the stops I provide the latter with the inclined faces $a$, which turn the bail out of the way to prevent its engaging with the stops. My coupling substantially forms a four-sided hollow frame, which, with the minimum of material, imparts great rigidity and strength to the joint, while in the locked position of the bail the strain is directly brought from one part of the coupling to the other in the line of the force and without any tendency to unlock the bail.

By making the locking-shoulder of the stops F slightly inclined the operation of locking and unlocking is very readily performed and without permitting any lost motion between the parts.

What I claim as my invention is—

In a pump-rod coupling for the purposes described, the two parts of the coupling slidingly engaged with each other upon opposite sides, a double bail pivotally secured to one, and two stops formed upon the other and adapted to engage with the two ends of the bail, substantially as and for the purposes described.

In testimony whereof I affix my signature, in presence of two witnesses, this 27th day of March, 1888.

CLARENCE J. HAMILTON.

Witnesses:
P. M. HULBERT,
JOHN SCHUMAN.